(12) United States Patent
Li

(10) Patent No.: US 12,363,227 B2
(45) Date of Patent: Jul. 15, 2025

(54) VIDEO CALL METHOD AND APPARATUS

(71) Applicant: VIVO MOBILE COMMUNICATION CO., LTD., Guangdong (CN)

(72) Inventor: Fangyuan Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 29 days.

(21) Appl. No.: 18/335,433

(22) Filed: Jun. 15, 2023

(65) Prior Publication Data

US 2023/0328181 A1    Oct. 12, 2023

Related U.S. Application Data

(63) Continuation of application No. PCT/CN2021/140151, filed on Dec. 21, 2021.

(30) Foreign Application Priority Data

Dec. 25, 2020 (CN) .......................... 202011558968.8

(51) Int. Cl.
  *H04M 3/533* (2006.01)
  *H04N 7/14* (2006.01)
(52) U.S. Cl.
  CPC ... *H04M 3/53375* (2013.01); *H04M 3/53333* (2013.01); *H04N 7/141* (2013.01)
(58) Field of Classification Search
  None
  See application file for complete search history.

(56) References Cited

U.S. PATENT DOCUMENTS

| | | | | |
|---|---|---|---|---|
| 6,147,977 A | * | 11/2000 | Thro | H04L 51/226 370/264 |
| 6,661,886 B1 | * | 12/2003 | Huart | H04M 1/65 379/215.01 |
| 2005/0248437 A1 | * | 11/2005 | Hellebust | H04M 19/041 340/7.51 |
| 2009/0010403 A1 | * | 1/2009 | Jorgensen | H04L 65/80 379/88.23 |
| 2011/0035687 A1 | * | 2/2011 | Katis | H04L 65/1059 715/758 |
| 2012/0252417 A1 | * | 10/2012 | Cai | H04W 4/16 455/413 |
| 2015/0215457 A1 | | 7/2015 | Kim et al. | |
| 2017/0357439 A1 | * | 12/2017 | Lemay | G06F 3/0484 |

(Continued)

FOREIGN PATENT DOCUMENTS

| | | |
|---|---|---|
| CN | 104123324 A | 10/2014 |
| CN | 107104887 A | 8/2017 |
| CN | 107835299 A | 3/2018 |

(Continued)

*Primary Examiner* — Hemant S Patel
(74) *Attorney, Agent, or Firm* — Price Heneveld LLP

(57) ABSTRACT

This application provides a video call method and apparatus. The method includes: identifying at least one unread voice message in instant communication content during a video call; determining priority of each of the at least one unread voice message; determining, based on the priority of each unread voice message, a target voice message, where the target voice message is an unread voice message with a highest priority among the at least one unread voice message; and playing the target voice message in a target channel.

14 Claims, 9 Drawing Sheets

(56) References Cited

U.S. PATENT DOCUMENTS

2018/0063685 A1    3/2018   Han et al.

FOREIGN PATENT DOCUMENTS

| | | |
|---|---|---|
| CN | 109274831 A | 1/2019 |
| CN | 109379497 A | 2/2019 |
| CN | 110278402 A | 9/2019 |
| CN | 111491058 A | 8/2020 |
| CN | 111555960 A | 8/2020 |
| CN | 111835922 A | 10/2020 |
| CN | 112672088 A | 4/2021 |
| JP | 2015015728 A | 1/2015 |
| JP | 2018533088 A | 11/2018 |

\* cited by examiner

VIDEO CALL METHOD AND APPARATUS

CROSS-REFERENCE TO RELATED APPLICATIONS

The present application is a continuation application of International Application No. PCT/CN2021/140151, filed on Dec. 21, 2021, which claims priority to Chinese Patent Application No. 202011558968.8, filed in China on Dec. 25, 2020. Each of the above-listed applications is incorporated herein by reference in its entirety.

TECHNICAL FIELD

This application relates to the field of communication technologies, and in particular, to a video call method and apparatus.

BACKGROUND

With the popularity of electronic devices, functions of electronic devices are becoming increasingly perfect, and users can use electronic devices to make video calls. In the implementation process of this application, the inventors have found at least the following problem in the prior art: in the prior art, a user is likely to neglect received voice messages while making a video call with an electronic device and thus may possibly miss certain important information.

SUMMARY

According to a first aspect, an embodiment of this application provides a video call method. The method includes:
  identifying at least one unread voice message in instant communication content during a video call;
  determining priority of each of the at least one unread voice message;
  determining, based on the priority of each unread voice message, a target voice message, where the target voice message is an unread voice message with a highest priority among the at least one unread voice message; and
  playing the target voice message in a target channel.

According to a second aspect, an embodiment of this application provides a video call apparatus. The apparatus includes:
  an identifying module, configured to identify at least one unread voice message in instant communication content during a video call;
  a first determining module, configured to determine priority of each of the at least one unread voice message;
  a second determining module, configured to determine, based on the priority of each unread voice message, a target voice message, where the target voice message is an unread voice message with a highest priority among the at least one unread voice message; and
  a playing module, configured to play the target voice message in a target channel.

According to a third aspect, an embodiment of this application provides an electronic device. The electronic device includes a processor, a memory, and a program or instructions stored in the memory and capable of running on the processor, and when the program or instructions are executed by the processor, the steps of the video call method according to the first aspect are implemented.

According to a fourth aspect, an embodiment of this application provides a readable storage medium. The readable storage medium stores a program or instructions, and when the program or instructions are executed by a processor, the steps of the video call method according to the first aspect are implemented.

According to a fifth aspect, an embodiment of this application provides a chip. The chip includes a processor and a communication interface, where the communication interface is coupled to the processor, and the processor is configured to run a program or instructions to implement the method according to the first aspect.

According to a sixth aspect, a computer program product is provided. The computer program product is stored in a non-transitory storage medium and is executed by at least one processor to implement the method according to the first aspect.

According to a seventh aspect, an electronic device is provided. The electronic device is configured to execute the method according to the first aspect.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application without creative efforts shall fall within the protection scope of this application.

The terms "first", "second", and the like in the specification and claims of this application are used to distinguish between similar objects rather than to describe a specific order or sequence. It should be understood that terms used in this way are interchangeable in appropriate circumstances such that the embodiments of this application can be implemented in an order other than those illustrated or described herein. In addition, "first" and "second" are typically used to distinguish objects of a same type and do not limit quantities of the objects. For example, there may be one or more first objects. In addition, "and/or" in the specification and claims represents at least one of connected objects, and the character "/" generally indicates that the contextually associated objects have an "or" relationship.

The following describes in detail a video call method provided in the embodiments of this application by using specific embodiments and application scenarios thereof with reference to the accompanying drawings.

Figure 1:
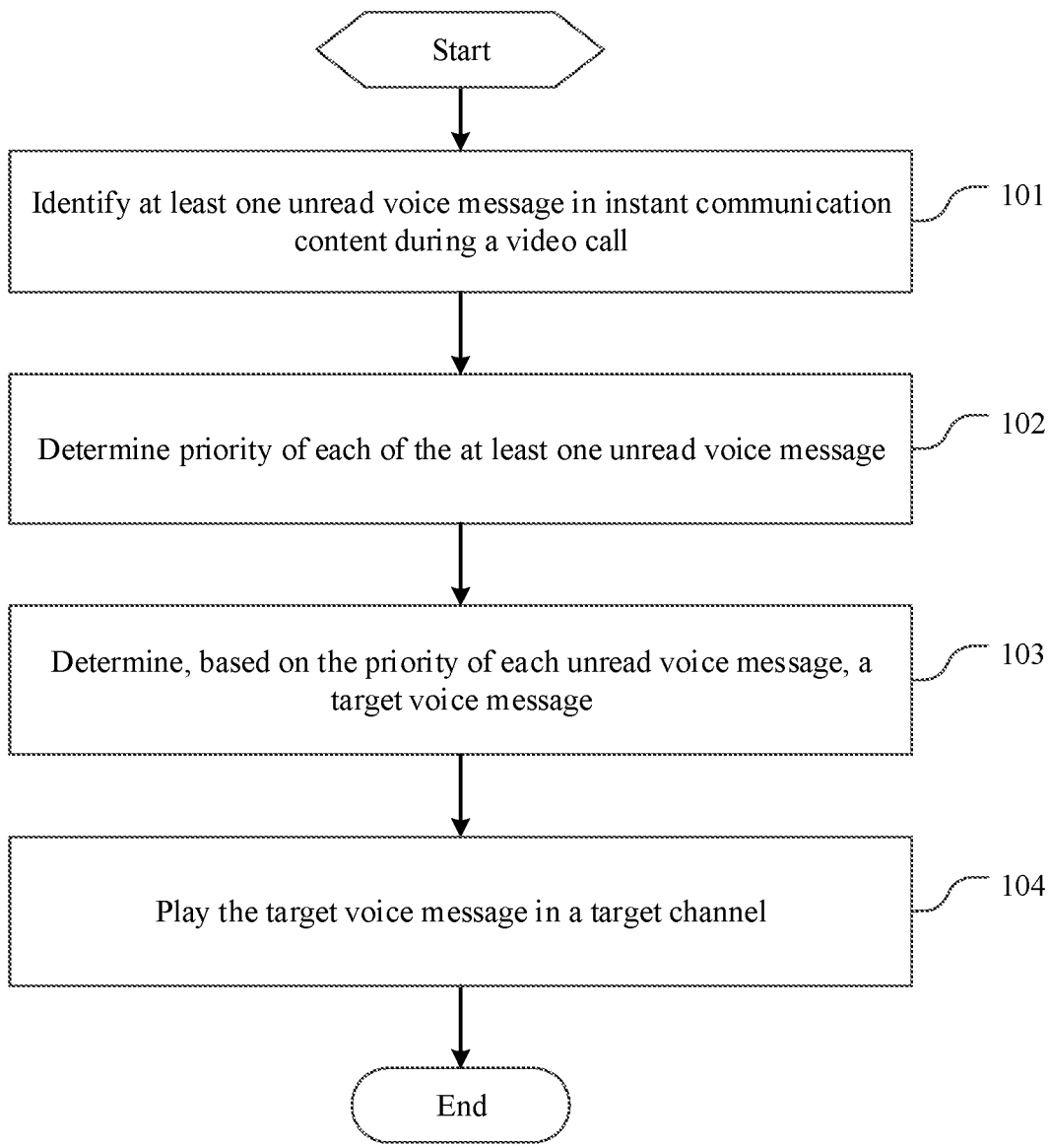
FIG. 1 is a flowchart of a video call method according to an embodiment of this application.

Refer to FIG. 1. FIG. 1 is a flowchart of a video call method according to an embodiment of this application. As shown in FIG. 1, the video call method includes the following steps.

Step 101. Identify at least one unread voice message in instant communication content during a video call.

The instant communication content may be communication content received via an instant communication application program. An application program for initiating the video call may be the same as or different from an application program for receiving the at least one unread voice message. For example, the video call may be implemented via a chat tool A. During the video call, at least one unread voice message is received via the chat tool A. Further, during a video call with a participant B via the chat tool A, voice messages sent by a chat participant C may be received via the chat tool A.

Step 102. Determine priority of each of the at least one unread voice message.

The priority of an unread voice message may include: a first priority, a second priority, a third priority, and the like, where the first priority is a highest priority. Alternatively, the priority may also include a high priority, a medium priority, a low priority, and the like, where the high priority is a highest priority. The representation form of priority is not limited in this embodiment.

In addition, each of the at least one unread voice message can be converted into a text message, key information in the text message is extracted, and the priority of each unread voice message is determined based on the key information. Alternatively, the priority of each unread voice message is determined based on sender of the unread voice message. For example, an unread voice message sent by a leader has the first priority. Still alternatively, the priority of the unread voice message is determined based on sending frequency of the unread voice message. For example, if one sender has sent a plurality of voice messages within a short time, the plurality of unread voice messages have the first priority. Yet alternatively, the priority of the unread voice message is determined based on time length of the unread voice message. For example, an unread voice message with a time length longer than a preset time length is determined to have the first priority. The manner of determining the priority of an unread voice message is not limited in this embodiment.

Step 103. Determine, based on the priority of each unread voice message, a target voice message, where the target voice message is an unread voice message with a highest priority among the at least one unread voice message.

With the priority of the unread voice message including a first priority, a second priority, and a third priority used as an example, the target voice message may be an unread voice message whose priority is the first priority. With the priority of the unread voice message including a high priority, a medium priority, and a low priority used as an example, the target voice message may be an unread voice message whose priority is the high priority.

Step 104. Play the target voice message in a target channel.

The target channel may be a left channel or a right channel. When a current play mode is a first play mode, the target voice message may be played in the right channel, and voice content of the video call may be played in the left channel, such that the target voice message is played while the voice content of the video call is being played. When a current play mode is a second play mode, playing of the voice content of the video call may be stopped, the target voice message may be played in the left channel or the right channel, and playing of the voice content of the video call may be resumed in a first channel when the playing of the target voice message is ended.

For example, the current play mode may be determined. When the current play mode is a first play mode, voice content of the video call is played in the right channel, and the target voice message is played in the left channel. When the current play mode is a second play mode, the playing of the voice content of the video call in the right channel is stopped, the target voice message is played in the left channel, and playing of the voice content of the video call is resumed when the playing of the target voice message is ended.

Figure 2:
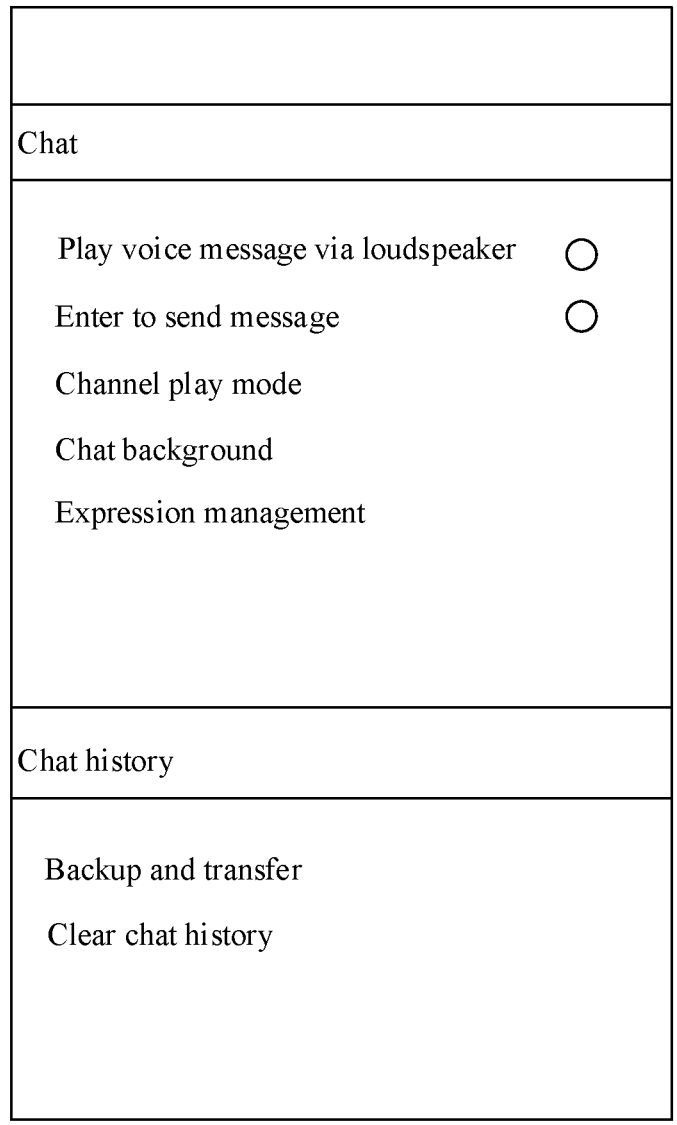
FIG. 2 is a first schematic diagram of screen display of an electronic device according to an embodiment of this application.
Figure 3:
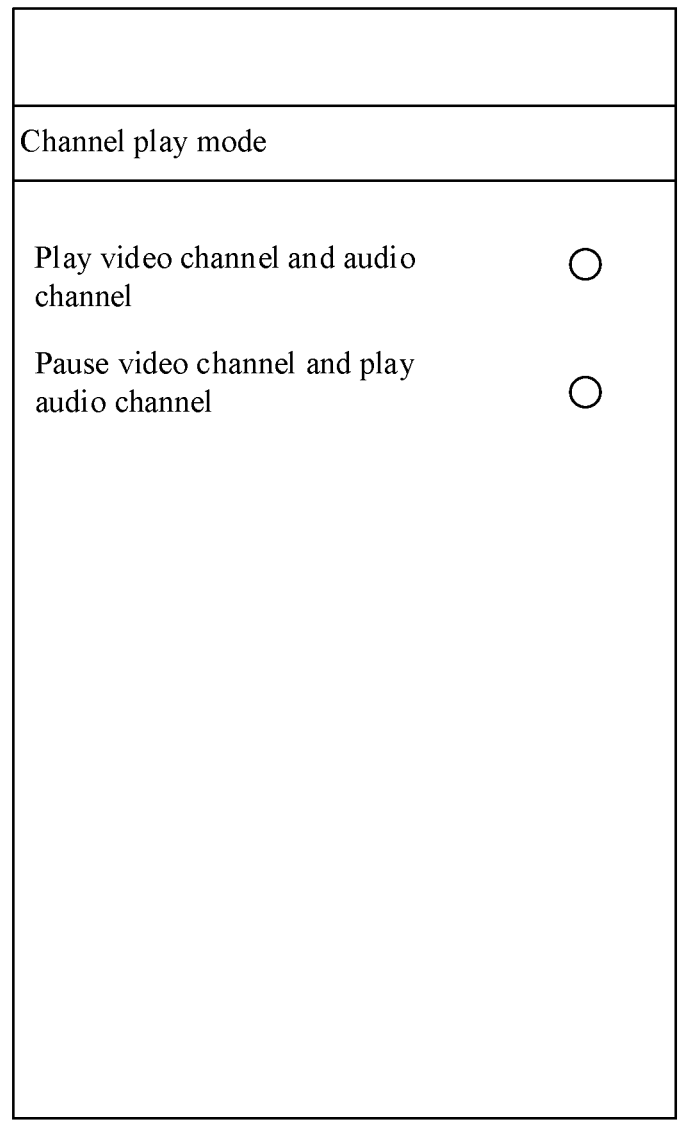
FIG. 3 is a second schematic diagram of screen display of an electronic device according to an embodiment of this application.

The first play mode may be a simultaneous channel play mode for playing the video channel and the audio channel simultaneously. The second play mode may be a switchable channel play mode for pausing the video channel and playing the audio channel. As shown in FIG. 2, a "Channel play mode" option may be provided on a setting page. After the "Channel play mode" is tapped, a play mode selection page is displayed. As shown in FIG. 3, "Play video channel and audio channel" and "Pause video channel and play audio channel" are displayed on the play mode selection page for the user to select a play mode.

In addition, the target voice message is played while the voice content of the video call is being played, where the voice content of the video call may be played in the left channel, and the target voice message may be played in the right channel. Alternatively, the voice content of the video call may be played in the right channel, and the target voice message may be played in the left channel.

It should be noted that voices from a plurality of voice sources can be played simultaneously in the simultaneous channel play mode. For example, the target voice message can be played while the voice content of the video call is being played. Switchable playing can be implemented among a plurality of voice sources in the switchable channel play mode. When a plurality of voice sources are present, one of the voice sources is temporarily turned off, and another voice source is played. For example, during playing of a target voice message, a video call channel is temporarily turned off and switched to the audio channel, and after playing of the target voice message is ended, playing is switched back to the video call channel.

In this way, different play manners are set for different play modes. The user can choose to play the target voice message while playing the voice content of the video call, or the user may choose to pause playing of the voice content of the video call and play the target voice message, thereby avoiding a problem that the user misses an important voice message because the user is unable to play voice messages during a video call. In addition, the user can also set a play mode according to the user's preferences or habits, such that voice messages are played in a more appropriate manner during the video call, thereby improving the effect of the video call.

It should be noted that, as the priority of each unread voice message is determined and the voice message with a higher priority is played as a target voice message while the video call is maintained, an electronic device is able to automatically filter the voice messages received, extract possibly important voice messages from the voice messages received, and play the possibly important voice messages during the video call, thereby avoiding neglect of the voice messages received during the video call, and reducing the possibility of the user missing an important voice message.

In the prior art, in a case that a user is making a video call and has received a voice message during the video call, "Function unavailable because a video call is active" will be displayed when the user taps the voice message received, so the user is unable to play the voice message during the video call. If the user has found that the voice message received is an important voice message that needs to be checked and replied to promptly, the user has to stop the video call before playing the voice message. This greatly affects the interactive experience of the user.

In this embodiment, a target voice message can be selected from at least one unread voice message, and the target voice message is played while the video call is maintained, such that an important voice message can be selectively played based on importance of the voice message during the video call, thereby avoiding missing of important and urgent voice messages.

In this embodiment of this application, during a video call, at least one unread voice message is received, a target voice message is determined from the at least one unread voice message, and the target voice message is played while the video call is maintained. In this way, target voice messages are played during the video call, avoiding neglect of important voice messages received during the video call, and possibly important voice messages are played, improving the effect of the video call.

Optionally, the playing the target voice message in the target channel includes:
  determining, based on priority of the video call and priority of the target voice message, a first volume of the target voice message; and
  playing the target voice message at the first volume in the target channel; where
  in a case that the priority of the video call is higher than the priority of the target voice message, the first volume is lower than a second volume of the video call; and
  in a case that the priority of the video call is lower than the priority of the target voice message, the first volume is higher than a second volume of the video call.

In a case that the priority of the video call is equal to the priority of the target voice message, the first volume may be equal to a second volume of the video call. The priority of the video call may be determined before the second volume for playing the voice content of the video call is determined. The priority of the video call may include: a first priority, a second priority, a third priority, and the like, or may include a high priority, a medium priority, a low priority, and the like. The priority of the video call and the priority of the unread voice message may have a common representation form.

In addition, the priority of the video call may be determined based on the opposite side of the video call. For example, if the opposite side of the video call is a leader, the video call may have the high priority, and if the opposite side of video call is a family member, the video call may have the medium priority. Alternatively, the priority of the video call may be determined based on content of the video call. For example, the content of the video call may be identified, if the content of the video call is work related, the video call may have the high priority, and if the content of the video call is unrelated to work, the video call may have the low priority.

In this implementation, content with a higher priority is played at a higher volume based on the priority of the video call and the priority of the target voice message, such that the volume for playing the voice content of the video call and the volume for playing the target voice message are automatically adjusted while the voice content of the video call and the target voice message are played simultaneously. In this way, the user can effectively focus on more important content among the content being played on the electronic device and thus obtains better user experience.

Optionally, the determining priority of each of the at least one unread voice message includes:
  converting each of the at least one unread voice message into a text message;
  extracting key information in the text message; and
  determining, based on the key information, the priority of each unread voice message.

The key information may include time information, for example, tomorrow, afternoon, and ten minutes later; or may include information of the opposite side, for example, leader, superior, father, and grandma; or may further include action information, for example, meeting, shopping, and going out. The text message may be matched against preset keywords to determine key information in the text message. Alternatively, the key information may be extracted using a key information extraction model. The key information extraction model may be a neural network model, and the key information extraction model can be trained by big data to extract key information in the text message. For example, the preset keywords may include immediately, right now, meeting, leader, and the like. The preset keywords hit can be used as key information in the text message.

In addition, for different key information, priorities may vary. For example, for time information, if "immediately" is hit, the priority may be the high priority; if "tomorrow" is hit, the priority may be the low priority; and if "afternoon" is hit, the priority may be the medium priority. For information of the opposite side, if "leader" is hit, the priority may be the high priority, and if "father" is hit, the priority may be the low priority. In a case that the text message includes a plurality of preset keywords, a highest priority corresponding to the included preset keywords can be used as the priority of the text message.

In this implementation, each of the at least one unread voice message is converted into a text message, key information in the text message is extracted, and the priority of each unread voice message is determined based on the key information. In this way, the priority of each unread voice message is determined based on the key information in the text message, such that content carried in the unread voice message can be identified to determine the priority of the unread voice message, and an important voice message can be determined accurately, thereby reducing the possibility of the user missing an important voice message.

Optionally, after the playing the target voice message in the target channel, the method further includes:

displaying a volume adjustment icon, where the volume adjustment icon is used to adjust a volume for playing voice content of the video call and a volume for playing the target voice message;

receiving a first input on the volume adjustment icon; and in response to the first input, adjusting the volume for playing voice content of the video call and the volume for playing the target voice message.

The volume adjustment icon may include a slider and a scrollbar that matches the slider. The slider is movable between two ends of the scrollbar. The first input may be an operation of sliding the slider, for example, sliding the slider leftward or sliding the slider rightward. For example, a left end of the scrollbar represents an audio channel, a right end of the scrollbar represents a video channel, the voice content of the video call is played in the right channel, and the target voice message is played in the left channel. When the slider moves toward the left end of the scrollbar, volume of the left channel becomes higher, so the target voice message is played at a higher volume; and when the slider moves toward the right end of the scrollbar, volume of the right channel becomes higher, so the voice content of the video call is played at a higher volume. By default, the slider may be arranged at a ⅓ position, where the target voice message is played at a volume that is twice the volume at which the voice content of the video call is played.

It should be noted that all adjustment icons that can be used to adjust the volume for playing the voice content of the video call and the volume for playing the target voice message can be used as the volume adjustment icon. The volume adjustment icon is not limited to any specific representation forms in this embodiment. The volume adjustment icon may be displayed when simultaneous playing of the voice content of the video call and the target voice message is identified. Users can appropriately adjust the volumes of the audio and video channels depending on the actual volume of the target voice message and personal requirements. If the volume of the audio channel is too low, even drowned out by the video channel, the slider may continue to be moved leftward to an appropriate position. If the volume of the audio channel is too high, the slider may be moved rightward to an appropriate position.

Figure 4:
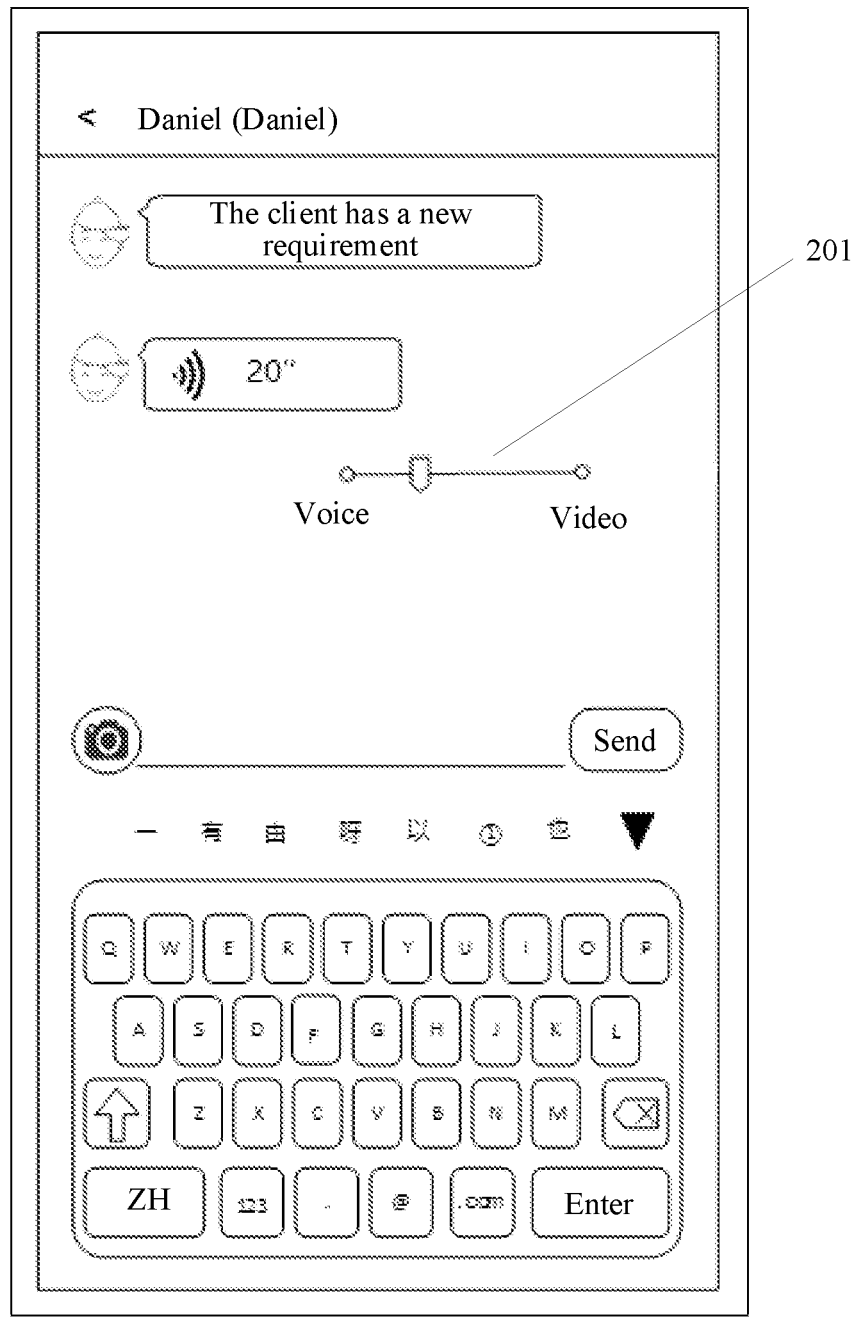
FIG. 4 is a third schematic diagram of screen display of an electronic device according to an embodiment of this application.

In actual application, during a video call, after a target voice message is determined from at least one unread voice message, an alert message corresponding to the target voice message may be displayed; and after a user tap on the alert message is detected, the video call page shrinks, and a chat page for the target voice message is displayed. As shown in FIG. 4, the volume adjustment icon 201 is displayed on the chat page for the target voice message.

It should be noted that a "Channel Setting" option may be provided on a setting page. After the "Channel Setting" option is tapped, a channel setting page is launched on which a "Start Video Volume Adjustment Mode" button is displayed. In this way, when the "Start Video Volume Adjustment Mode" button is turned on, the volume adjustment icon is displayed, and when the "Start Video Volume Adjustment Mode" button is turned off, display of the volume adjustment icon is canceled.

In this implementation, with the volume adjustment icon provided, when the voice content of the video call and the target voice message are played, the user can manually adjust the volume for playing the voice content of the video call and the volume for playing the target voice message, and thus can adjust the volume adjustment icon based on actual requirements, delivering a good user experience.

Optionally, before the playing the target voice message in the target channel, the method further includes:

displaying the target voice message and displaying a play icon for the target voice message, where the play icon is used to represent a play progress of the target voice message; and after the playing the target voice message in the target channel, the method further includes:

updating the play icon based on the play progress of the target voice message during playing of the target voice message;

receiving a second input on the play icon; and in response to the second input, adjusting the play progress of the target voice message.

The call page for displaying the video call may be reduced and the chat page for the target voice message may be displayed, where the target voice message is displayed on the chat page for the target voice message. The play icon may include a play progress bar, and the play progress of the target voice message can be determined according to a play position indicated by the play progress bar. The second input may be an input of moving the play progress bar on the play icon, for example, an operation of moving the play progress bar to a ½ position, or an operation of moving the play progress bar to a ¼ position. After the play progress of the target voice message is adjusted, the target voice message can be played according to the adjusted play progress.

In this implementation, with the play icon provided, the play progress of the target voice message can be displayed in real time, and the user can adjust the play progress of the target voice message with the play icon, so the user can drag the play icon to easily find important content when needing to reconfirm the important content in the target voice message, avoiding the effect of the video call being affected by repeated playing of a target voice message which carries too much voice content, thereby further improving the effect of the video call.

It should be noted that the video call method according to the embodiments of this application may be executed by a video call apparatus or a control module for executing and loading the video call method in the video call apparatus. In embodiments of this application, an example in which the video call apparatus executes and loads the video call method is used for describing the video call apparatus according to the embodiments of this application.

Figure 5:
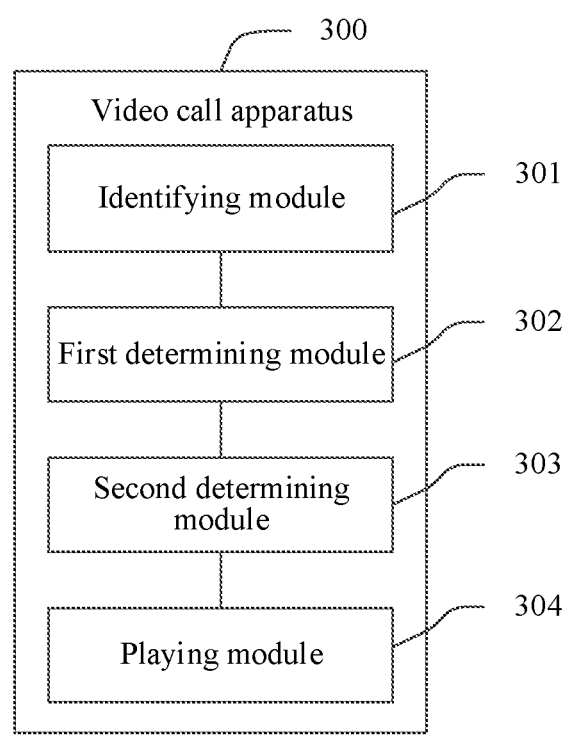
FIG. 5 is a first schematic structural diagram of a video call apparatus according to an embodiment of this application.

Refer to FIG. 5. FIG. 5 is a schematic structural diagram of a video call apparatus according to an embodiment of this application. As shown in FIG. 5, the video call apparatus 300 includes:

an identifying module 301, configured to identify at least one unread voice message in instant communication content during a video call;

a first determining module 302, configured to determine priority of each of the at least one unread voice message;

a second determining module 303, configured to determine, based on the priority of each unread voice message, a target voice message, where the target voice message is an unread voice message with a highest priority among the at least one unread voice message; and a playing module 304, configured to play the target voice message in a target channel.

In this embodiment of this application, during a video call, the identifying module identifies at least one unread voice message in instant communication content; the first determining module determines priority of each of the at least one unread voice message; the second determining module determines a target voice message based on the priority of each unread voice message, where the target voice message is an unread voice message with a highest priority among the at least one unread voice message; and the playing module plays the target voice message in a target channel. In this way, target voice messages are played during the video call, avoiding neglect of important voice messages received during the video call without affecting the video call.

Optionally, the playing module 304 is specifically configured to:
  determine, based on priority of the video call and priority of the target voice message, a first volume of the target voice message; and
  play the target voice message at the first volume in the target channel; where
  in a case that the priority of the video call is higher than the priority of the target voice message, the first volume is lower than a second volume of the video call; and
  in a case that the priority of the video call is lower than the priority of the target voice message, the first volume is higher than a second volume of the video call.

Optionally, the first determining module 303 is specifically configured to:
  convert each of the at least one unread voice message into a text message;
  extract key information in the text message; and
  determine, based on the key information, the priority of each unread voice message.

Figure 6:
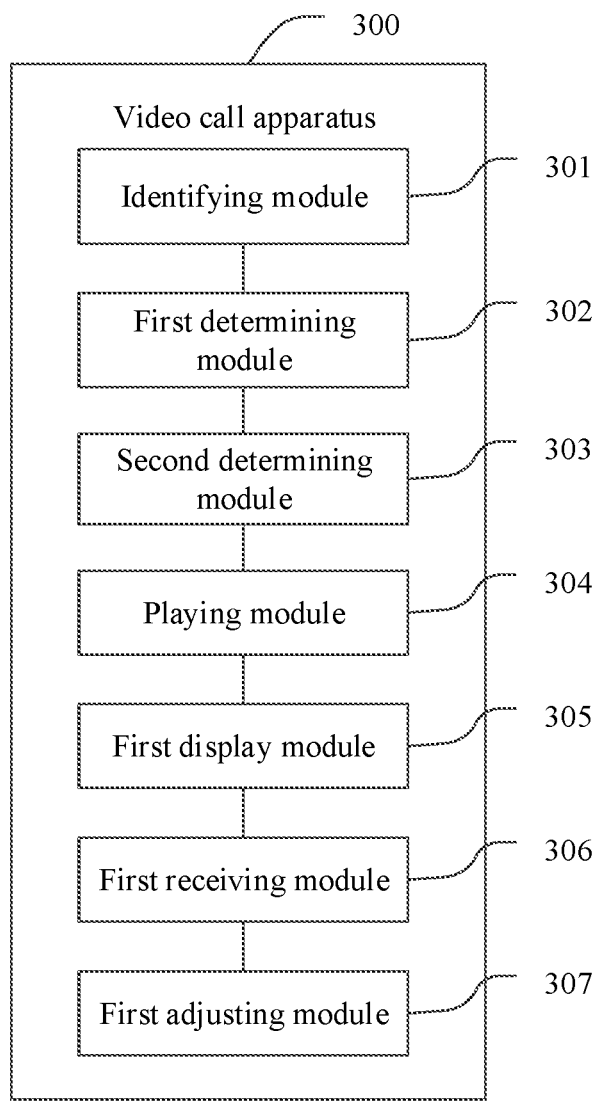
FIG. 6 is a second schematic structural diagram of a video call apparatus according to an embodiment of this application.

Optionally, as shown in FIG. 6, the video call apparatus 300 further includes:
  a first display module 305, configured to display a volume adjustment icon, where the volume adjustment icon is used to adjust a volume for playing voice content of the video call and a volume for playing the target voice message;
  a first receiving module 306, configured to receive a first input on the volume adjustment icon; and
  a first adjusting module 307, configured to adjust the volume for playing voice content of the video call and the volume for playing the target voice message in response to the first input.

Figure 7:
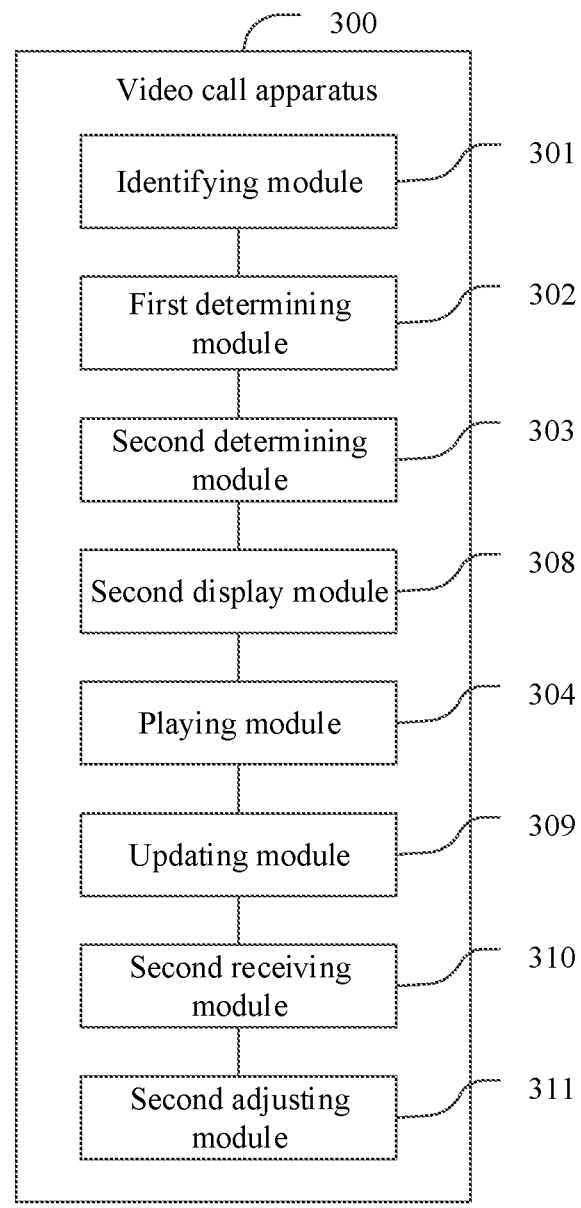
FIG. 7 is a third schematic structural diagram of a video call apparatus according to an embodiment of this application.

Optionally, as shown in FIG. 7, the video call apparatus 300 further includes:
  a second display module 308, configured to display the target voice message and display a play icon for the target voice message, where the play icon is used to represent a play progress of the target voice message;
  an updating module 309, configured to update the play icon based on the play progress of the target voice message during playing of the target voice message;
  a second receiving module 310, configured to receive a second input on the play icon; and
  a second adjusting module 311, configured to adjust the play progress of the target voice message in response to the second input.

The video call apparatus in this embodiment of this application may be an apparatus or a component, integrated circuit, or chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in this embodiment of this application.

The video call apparatus in this embodiment of this application may be an apparatus having an operating system. The operating system may be an Android operating system, an iOS operating system, or other possible operating systems. This is not specifically limited in this embodiment of this application.

The video call apparatus in this embodiment of this application can implement the processes implemented in the method embodiment of FIG. 1. To avoid repetition, details are not described herein again.

Figure 8:
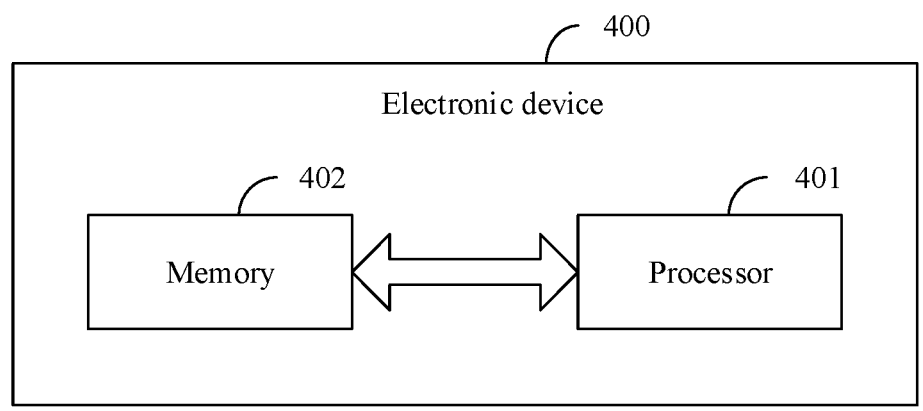
FIG. 8 is a first schematic structural diagram of an electronic device according to an embodiment of this application.

Optionally, as shown in FIG. 8, an embodiment of this application further provides an electronic device 400 including a processor 401, a memory 402, and a program or instructions stored in the memory 402 and capable of running on the processor 401. When the program or instructions are executed by the processor 401, the processes of the foregoing video call method embodiments are implemented, with the same technical effects achieved. To avoid repetition, details are not described herein again.

It should be noted that the electronic device in this embodiment of this application includes the foregoing mobile electronic device and non-mobile electronic device.

Figure 9:
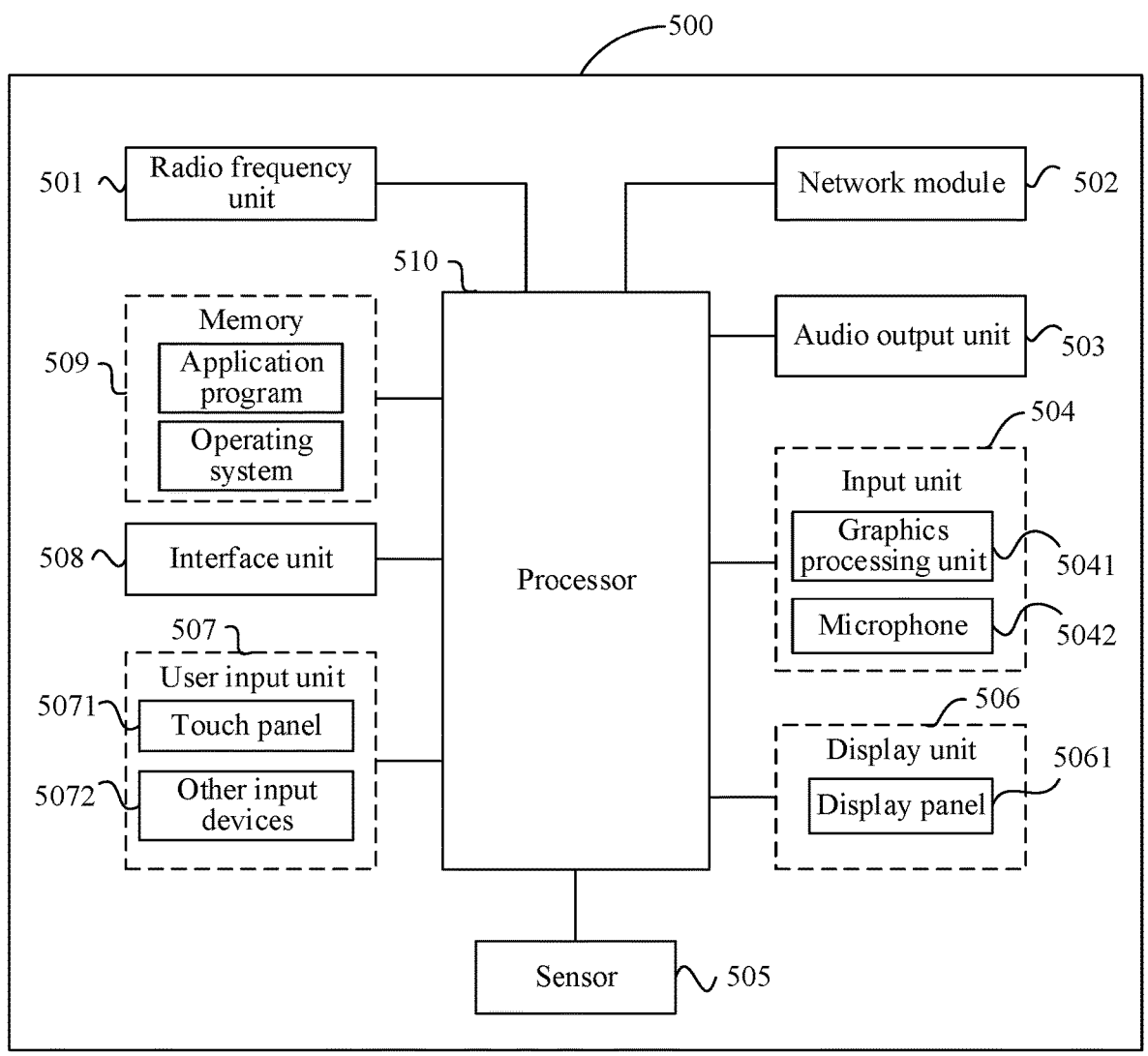
FIG. 9 is a second schematic structural diagram of an electronic device according to an embodiment of this application.

FIG. 9 is a schematic diagram of a hardware structure of an electronic device according to an embodiment of this application.

The electronic device 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

Those skilled in the art can understand that the electronic device 500 may further include a power supply (for example, battery) that supplies power to various components. The power supply may be logically connected to the processor 510 via a power management system, so that functions such as charge and discharge management and power consumption management are implemented via the power management system. The structure of the electronic device shown in FIG. 9 does not constitute any limitation on the electronic device, and the electronic device may include more or fewer components than shown in the figure, or combine some of the components, or have different arrangements of the components. Details are not described herein.

The processor 510 is configured to identify at least one unread voice message in instant communication content during a video call.

The processor 510 is further configured to determine priority of each of the at least one unread voice message.

The processor 510 is further configured to determine, based on the priority of each unread voice message, a target voice message, where the target voice message is an unread voice message with a highest priority among the at least one unread voice message.

The audio output unit 503 is configured to play the target voice message in a target channel.

In this embodiment of this application, during a video call, the processor 510 identifies at least one unread voice message in instant communication content; the processor 510 determines priority of each of the at least one unread voice message; the processor 510 determines a target voice message based on the priority of each unread voice message, where the target voice message is an unread voice message with a highest priority among the at least one unread voice message; and the audio output unit 503 plays the target voice message in a target channel. In this way, target voice messages are played during the video call, avoiding neglect of important voice messages received during the video call without affecting the video call.

Optionally, the processor 510 is further configured to determine, based on priority of the video call and priority of the target voice message, a first volume of the target voice message.

The audio output unit 503 is configured to play the target voice message at the first volume in the target channel.

In a case that the priority of the video call is higher than the priority of the target voice message, the first volume is lower than a second volume of the video call.

In a case that the priority of the video call is lower than the priority of the target voice message, the first volume is higher than a second volume of the video call.

Optionally, the processor 510 is further configured to:
convert each of the at least one unread voice message into a text message;
extract key information in the text message; and
determine, based on the key information, the priority of each unread voice message.

Optionally, the display unit 506 is configured to display a volume adjustment icon, where the volume adjustment icon is used to adjust a volume for playing voice content of the video call and a volume for playing the target voice message.

The user input unit 507 is configured to receive a first input on the volume adjustment icon.

The processor 510 is further configured to: in response to the first input, adjust the volume for playing voice content of the video call and the volume for playing the target voice message.

Optionally, the display unit 506 is further configured to display the target voice message and display a play icon for the target voice message, where the play icon is used to represent a play progress of the target voice message.

The processor 510 is further configured to update the play icon based on the play progress of the target voice message during playing of the target voice message.

The user input unit 507 is further configured to receive a second input on the play icon.

The processor 510 is further configured to adjust the play progress of the target voice message in response to the second input.

It should be understood that in this embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in an image capture mode or a video capture mode. The display unit 506 may include a display panel 5061. The display panel 5061 may be configured in a form of a liquid crystal display, an organic light-emitting diode display, or the like. The user input unit 507 includes a touch panel 5071 and other input devices 5072. The touch panel 5071 is also referred to as a touchscreen. The touch panel 5071 may include two parts: a touch detection apparatus and a touch controller. The other input devices 5072 may include but are not limited to a physical keyboard, a function button (for example, a volume control button or a power on/off button), a trackball, a mouse, and a joystick. Details are not described herein. The memory 509 may be configured to store software programs and various data which include but are not limited to an application program and an operating system. The processor 510 may integrate an application processor and a modem processor.

The application processor mainly processes an operating system, a user interface, an application program, and the like. The modem processor mainly processes wireless communication. It can be understood that the modem processor may alternatively be not integrated in the processor 510.

An embodiment of this application further provides a readable storage medium. The readable storage medium may be volatile or non-volatile, and stores a program or instructions. When the program or instructions are executed by a processor, the processes of the foregoing video call method embodiments are implemented, with the same technical effects achieved. To avoid repetition, details are not described herein again.

The processor is a processor in the electronic device described in the foregoing embodiments. The readable storage medium includes a computer readable storage medium, such as a computer read-only memory (ROM), a random access memory (RAM), a magnetic disk, or an optical disc.

An embodiment of this application further provides a chip. The chip includes a processor and a communication interface. The communication interface is coupled to the processor. The processor is configured to run a program or instructions to implement the processes of the foregoing video call method embodiments, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product, where the computer program product is stored in a non-transitory readable storage medium. When the computer program product is executed by at least one processor, the processes of the foregoing video call method embodiments are implemented, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the embodiments of this application is not limited to executing the functions in an order shown or discussed, but may also include executing the functions in a substantially simultaneous manner or in a reverse order, depending on the functions involved. For example, the described methods may be executed in an order different from that described, and various steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A video call method, comprising:
   identifying a plurality of unread voice messages in instant communication content during a video call;
   determining priority of each of the plurality of unread voice messages;
   determining, based on the priority of each unread voice message, a target voice message, wherein the target voice message is an unread voice message with a highest priority among the plurality of unread voice messages; and
   playing the target voice message in a target channel;
   wherein the method further comprises:
   after the target voice message is determined from the plurality of unread voice messages, displaying an alert message corresponding to the target voice message;
   shrinking a video call page and displaying a chat page for the target voice message in response to that a user tap on the alert message is detected;
   displaying a volume adjustment icon on the chat page for the target voice message, wherein the volume adjustment icon is used to adjust a volume for playing voice content of the video call and a volume for playing the target voice message; wherein the volume adjustment icon comprises a slider and a scrollbar that matches the slider, the slider is movable between two ends of the scrollbar, the first input is an operation of sliding the slider, and two ends of the scrollbar represent a maximum volume for playing the voice content of the video call and a maximum volume for playing the target voice information respectively;
   receiving a first input on the volume adjustment icon; and
   in response to the first input, adjusting the volume for playing voice content of the video call and the volume for playing the target voice message.

2. The method according to claim 1, wherein the playing the target voice message in the target channel comprises:
   determining, based on priority of the video call and priority of the target voice message, a first volume of the target voice message; and
   playing the target voice message at the first volume in the target channel; wherein
   in a case that the priority of the video call is higher than the priority of the target voice message, the first volume is lower than a second volume of the video call; and
   in a case that the priority of the video call is lower than the priority of the target voice message, the first volume is higher than a second volume of the video call.

3. The method according to claim 1, wherein the determining priority of each of the plurality of unread voice messages comprises:
   converting each of the plurality of unread voice messages into a text message;
   extracting key information in the text message; and
   determining, based on the key information, the priority of each unread voice message.

4. The method according to claim 1, before the playing the target voice message in the target channel, the method further comprises:
   displaying the target voice message and displaying a play icon for the target voice message, wherein the play icon is used to represent a play progress of the target voice message; and
   after the playing the target voice message in the target channel, the method further comprises:
   updating the play icon based on the play progress of the target voice message during playing of the target voice message;
   receiving a second input on the play icon; and
   in response to the second input, adjusting the play progress of the target voice message.

5. The method according to claim 1, wherein the volume adjustment icon is displayed when simultaneous playing of the voice content of the video call and the target voice message is identified.

6. The method according to claim 1, wherein by default, the slider is arranged at a ⅓ position of the scrollbar, wherein the target voice message is played at a volume that is twice the volume at which the voice content of the video call is played.

7. An electronic device, comprising a processor, a memory, and a program or instructions stored in the memory and capable of running on the processor, wherein the program or instructions are executed by the processor to implement the following steps:
   identifying a plurality of unread voice messages in instant communication content during a video call;
   determining priority of each of the plurality of unread voice messages;
   determining, based on the priority of each unread voice message, a target voice message, wherein the target voice message is an unread voice message with a highest priority among the plurality of unread voice messages; and
   playing the target voice message in a target channel;
   wherein the program or instructions are executed by the processor to implement:
   after the target voice message is determined from the plurality of unread voice messages, displaying an alert message corresponding to the target voice message;
   shrinking a video call page and displaying a chat page for the target voice message in response to that a user tap on the alert message is detected;
   displaying a volume adjustment icon on the chat page for the target voice message, wherein the volume adjustment icon is used to adjust a volume for playing voice content of the video call and a volume for playing the target voice message; wherein the volume adjustment icon comprises a slider and a scrollbar that matches the slider, the slider is movable between two ends of the scrollbar, the first input is an operation of sliding the slider, and two ends of the scrollbar represent a maximum volume for playing the voice content of the video call and a maximum volume for playing the target voice information respectively;

receiving a first input on the volume adjustment icon; and in response to the first input, adjusting the volume for playing voice content of the video call and the volume for playing the target voice message.

8. The electronic device according to claim 7, wherein the playing the target voice message in the target channel comprises:

determining, based on priority of the video call and priority of the target voice message, a first volume of the target voice message; and playing the target voice message at the first volume in the target channel; wherein in a case that the priority of the video call is higher than the priority of the target voice message, the first volume is lower than a second volume of the video call; and in a case that the priority of the video call is lower than the priority of the target voice message, the first volume is higher than a second volume of the video call.

9. The electronic device according to claim 7, wherein the determining priority of each of the plurality of unread voice messages comprises:

converting each of the plurality of unread voice messages into a text message;

extracting key information in the text message; and determining, based on the key information, the priority of each unread voice message.

10. The electronic device according to claim 7, wherein before the playing the target voice message in the target channel, the program or instructions are further executed by the processor to implement the following steps:

displaying the target voice message and displaying a play icon for the target voice message, wherein the play icon is used to represent a play progress of the target voice message; and after the playing the target voice message in the target channel, the method further comprises:

updating the play icon based on the play progress of the target voice message during playing of the target voice message;

receiving a second input on the play icon; and in response to the second input, adjusting the play progress of the target voice message.

11. A non-transitory computer readable storage medium, wherein the non-transitory readable storage medium stores a program or instructions, and the program or instructions are executed by a processor to implement the following steps:

identifying a plurality of unread voice messages in instant communication content during a video call;

determining priority of each of the plurality of unread voice messages;

determining, based on the priority of each unread voice message, a target voice message, wherein the target voice message is an unread voice message with a highest priority among the plurality of unread voice messages; and playing the target voice message in a target channel;

wherein the program or instructions are executed by the processor to implement:

after the target voice message is determined from the plurality of unread voice messages, displaying an alert message corresponding to the target voice message;

shrinking a video call page and displaying a chat page for the target voice message in response to that a user tap on the alert message is detected;

displaying a volume adjustment icon on the chat page for the target voice message, wherein the volume adjustment icon is used to adjust a volume for playing voice content of the video call and a volume for playing the target voice message; wherein the volume adjustment icon comprises a slider and a scrollbar that matches the slider, the slider is movable between two ends of the scrollbar, the first input is an operation of sliding the slider, and two ends of the scrollbar represent a maximum volume for playing the voice content of the video call and a maximum volume for playing the target voice information respectively;

receiving a first input on the volume adjustment icon; and in response to the first input, adjusting the volume for playing voice content of the video call and the volume for playing the target voice message.

12. The non-transitory computer readable storage medium according to claim 11, wherein the playing the target voice message in the target channel comprises:

determining, based on priority of the video call and priority of the target voice message, a first volume of the target voice message; and playing the target voice message at the first volume in the target channel; wherein in a case that the priority of the video call is higher than the priority of the target voice message, the first volume is lower than a second volume of the video call; and in a case that the priority of the video call is lower than the priority of the target voice message, the first volume is higher than a second volume of the video call.

13. The non-transitory computer readable storage medium according to claim 11, wherein the determining priority of each of the plurality of unread voice messages comprises:

converting each of the plurality of unread voice messages into a text message;

extracting key information in the text message; and determining, based on the key information, the priority of each unread voice message.

14. The non-transitory computer readable storage medium according to claim 11, wherein before the playing the target voice message in the target channel, the program or instructions are further executed by the processor to implement the following steps:

displaying the target voice message and displaying a play icon for the target voice message, wherein the play icon is used to represent a play progress of the target voice message; and after the playing the target voice message in the target channel, the method further comprises:

updating the play icon based on the play progress of the target voice message during playing of the target voice message;

receiving a second input on the play icon; and in response to the second input, adjusting the play progress of the target voice message.

* * * * *